(12) United States Patent
Salter et al.

(10) Patent No.: US 10,023,100 B2
(45) Date of Patent: Jul. 17, 2018

(54) ILLUMINATED TRIM ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); James J. Surman, Clinton Township, MI (US); Pietro Buttolo, Dearborn Heights, MI (US); Dragos Maciuca, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 14/968,200

(22) Filed: Dec. 14, 2015

(65) Prior Publication Data

US 2017/0166107 A1 Jun. 15, 2017

(51) Int. Cl.
| | |
|---|---|
| *F21V 9/00* | (2018.01) |
| *B60Q 1/00* | (2006.01) |
| *B60R 13/04* | (2006.01) |
| *B60Q 1/26* | (2006.01) |
| *F21V 9/16* | (2006.01) |
| *F21V 8/00* | (2006.01) |
| *F21V 9/30* | (2018.01) |
| *F21Y 115/10* | (2016.01) |

(52) U.S. Cl.
CPC ......... *B60Q 1/0017* (2013.01); *B60Q 1/2615* (2013.01); *B60Q 1/2696* (2013.01); *B60R 13/04* (2013.01); *F21V 9/16* (2013.01); *F21V 9/30* (2018.02); *G02B 6/001* (2013.01); *G02B 6/0051* (2013.01); *F21Y 2115/10* (2016.08)

(58) Field of Classification Search
CPC .. B60Q 1/0017; B60Q 1/2615; B60Q 1/2696; B60R 13/04; F21V 9/16; F21V 9/30; G02B 6/001; G02B 6/0051; F21Y 2115/10
USPC .................................. 362/511, 512, 551, 581
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,434,013 A | 7/1995 | Fernandez | |
| 5,465,194 A * | 11/1995 | Currie | B60Q 1/0011 362/464 |
| 5,709,453 A | 1/1998 | Krent et al. | |
| 5,839,718 A | 11/1998 | Hase et al. | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Anh Mai
*Assistant Examiner* — Glenn Zimmerman
(74) *Attorney, Agent, or Firm* — Jason Rogers; Price Heneveld LLP

(57) ABSTRACT

A vehicle trim assembly is disclosed herein. The vehicle trim assembly includes a member having a transmissive member portion therein. A light source is configured to emit light through the light transmissive portion. A first photoluminescent structure is disposed within the member. A second photoluminescent structure is separated from the member and operably coupled with the light source. The first and second photoluminescent structures are configured to luminesce in response to excitation by the light source.

20 Claims, 15 Drawing Sheets

(56) References Cited

U.S. PATENT DOCUMENTS

| | | | |
|---|---|---|---|
| 5,876,108 A * | 3/1999 | Chien | B60Q 1/326 362/103 |
| 5,909,081 A * | 6/1999 | Eida | H01L 51/5253 313/504 |
| 6,031,511 A | 2/2000 | DeLuca et al. | |
| 6,117,362 A | 9/2000 | Yen et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,568,659 B2 | 2/2017 | Verger et al. | |
| 9,616,812 B2 | 4/2017 | Sawayanagi | |
| 2002/0071285 A1 * | 6/2002 | Tufte | B60Q 1/32 362/505 |
| 2002/0159741 A1 | 10/2002 | Graves et al. | |
| 2002/0163792 A1 | 11/2002 | Formoso | |
| 2003/0038295 A1 * | 2/2003 | Koda | H01L 33/507 257/98 |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2004/0264207 A1 * | 12/2004 | Jones | B60Q 1/326 362/500 |
| 2005/0084229 A1 * | 4/2005 | Babbitt | G02B 6/001 385/146 |
| 2005/0189795 A1 | 9/2005 | Roessler | |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0008101 A1 * | 1/2010 | Bucher | B60Q 1/0052 362/565 |
| 2010/0102736 A1 | 4/2010 | Hessling | |
| 2011/0012062 A1 | 1/2011 | Agrawal et al. | |
| 2012/0001406 A1 | 1/2012 | Paxton et al. | |
| 2012/0074841 A1 * | 3/2012 | Liu | B60Q 1/2611 315/77 |
| 2012/0104954 A1 | 5/2012 | Huang | |
| 2012/0183677 A1 | 7/2012 | Agrawal et al. | |
| 2012/0257407 A1 * | 10/2012 | Demma | B60R 13/04 362/602 |
| 2012/0280528 A1 | 11/2012 | Dellock et al. | |
| 2013/0050979 A1 | 2/2013 | Van De Ven et al. | |
| 2013/0092965 A1 | 4/2013 | Kijima et al. | |
| 2013/0201672 A1 * | 8/2013 | Bushee | F21V 15/04 362/190 |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 * | 7/2014 | Cannon | B60Q 3/54 362/555 |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |
| 2016/0053949 A1 * | 2/2016 | Zehetner | F21K 9/56 362/84 |
| 2016/0102819 A1 | 4/2016 | Misawa et al. | |

(56) References Cited

U.S. PATENT DOCUMENTS

2016/0131327 A1   5/2016  Moon et al.
2016/0236613 A1   8/2016  Trier
2017/0158125 A1   6/2017  Schuett et al.

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |
| WO | WO 2014161927 A1 * 10/2014 | ............... F21K 9/56 |

\* cited by examiner

US 10,023,100 B2

ILLUMINATED TRIM ASSEMBLY

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a vehicle trim assembly is disclosed. The vehicle trim assembly includes a member. A light source is operably coupled to a light guide. The light guide transmits light along the member. A first photoluminescent structure is disposed within the light guide and configured to luminesce in response to excitation by the light source.

According to another aspect of the present invention, a trim assembly for a vehicle is disclosed. The trim assembly for a vehicle includes a member having a light transmissive portion. A light source is configured to emit light through the light transmissive portion. A luminescent structure is operably coupled with the light transmissive portion and is configured to luminesce in response to excitation by the light source.

According to yet another aspect of the present invention, a vehicle trim assembly is disclosed. The vehicle trim assembly includes a member having a light transmissive portion therein. A light source is configured to emit light through the light transmissive portion. A first photoluminescent structure is disposed within the member. A second photoluminescent structure is separated from the member and is operably coupled with the light source The first and second photoluminescent structures are configured to luminesce in response to excitation by the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
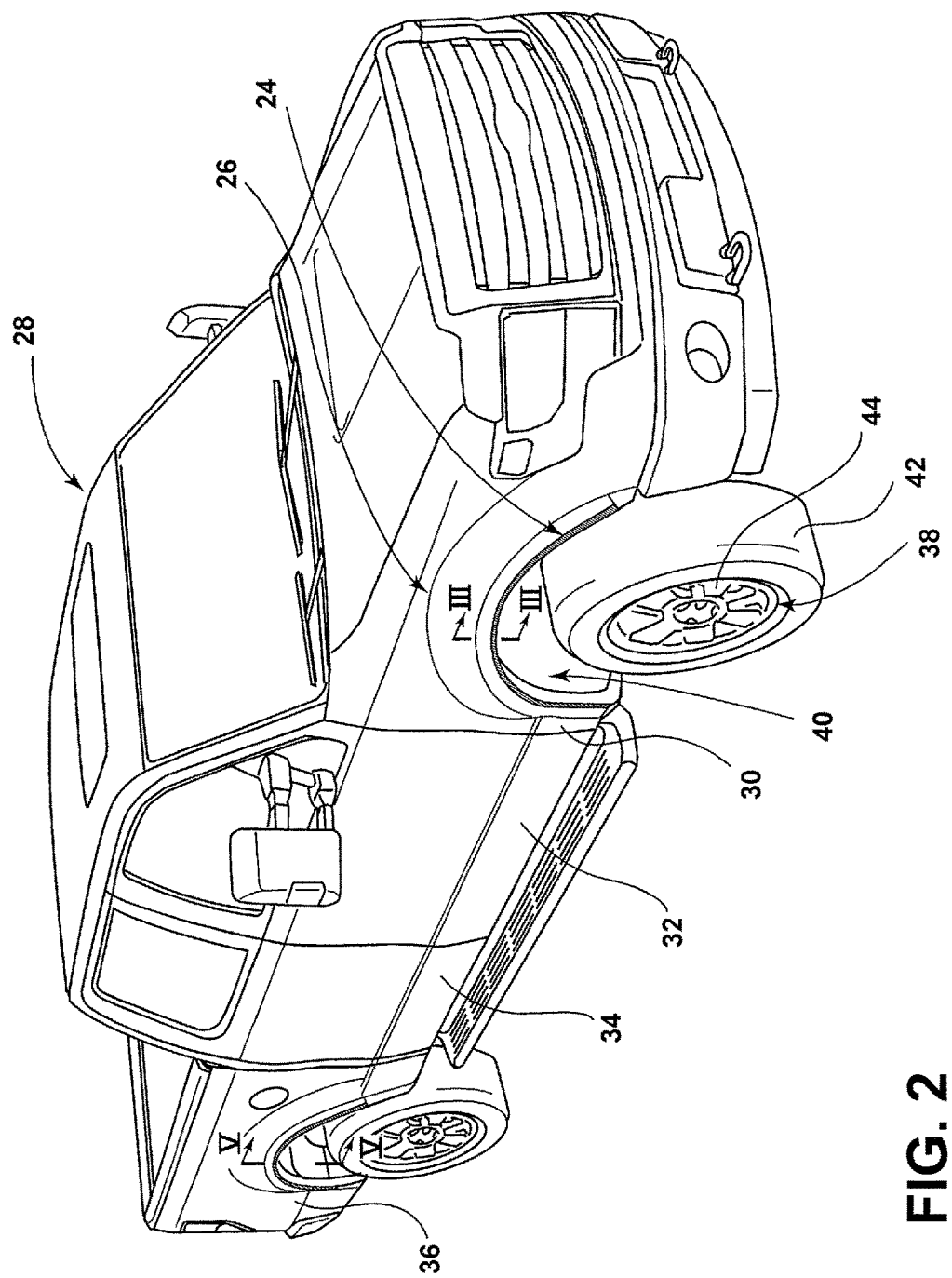
FIG. 2 is a perspective view of a vehicle equipped with an illuminated trim assembly circumferentially disposed around a wheel-well opening 40 of the vehicle, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated trim assembly for a vehicle. The trim assembly may advantageously employ one or more photoluminescent structures that illuminate in response to pre-defined events. The one or more photoluminescent structures may be configured to convert light received from an associated light source and re-emit the light at a different wavelength typically found in the visible wavelength spectrum.

Figure 1A:
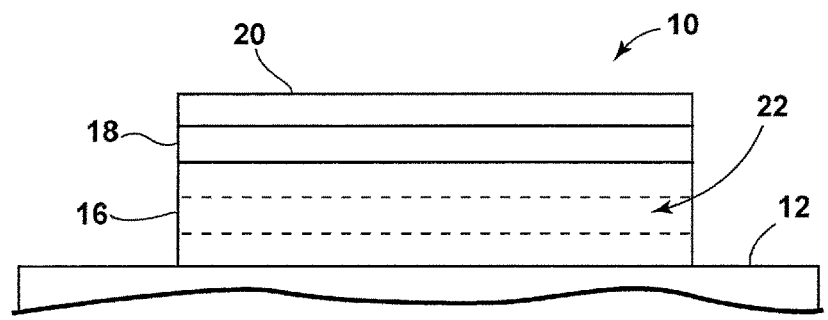
FIG. 1A is a side view of a photoluminescent structure rendered as a coating for use in a trim assembly according to one embodiment.
Figure 1B:
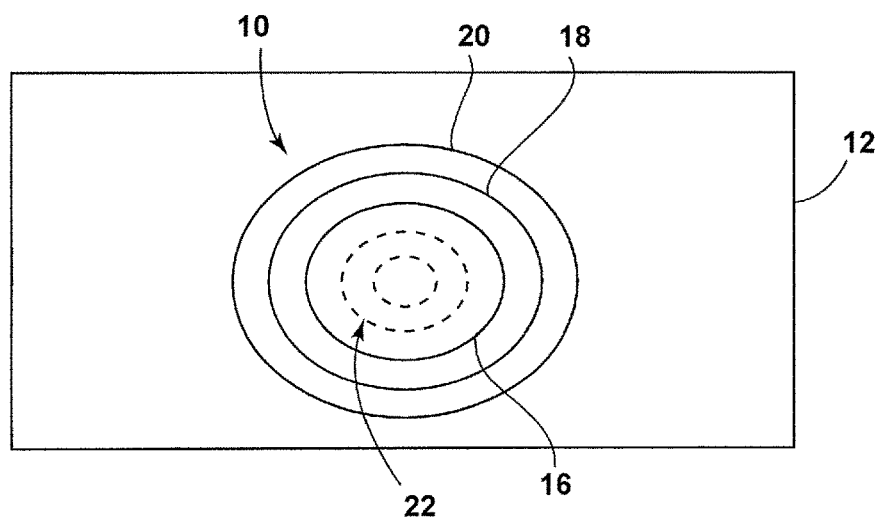
FIG. 1B is a top view of a photoluminescent structure rendered as a discrete particle according to one embodiment.
Figure 1C:
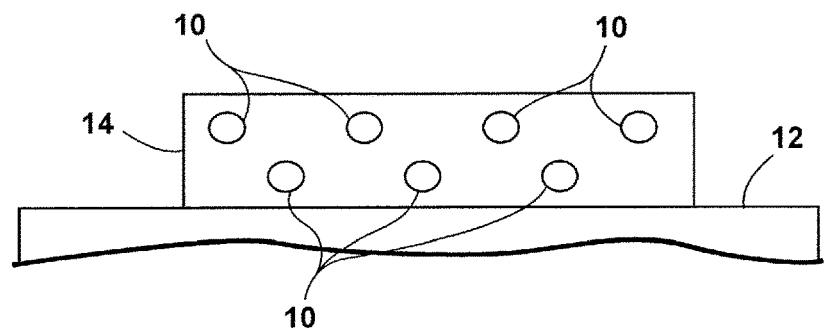
FIG. 1C is a side view a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials 22 having energy converting elements with phosphorescent or fluorescent properties. Each photoluminescent material 22 may become excited upon receiving light of a specific wavelength, thereby causing the light to undergo a conversion process. Under the principle of down conversion, the inputted light 100 (FIG. 9B) is converted into a longer wavelength light that is outputted from the photoluminescent structure 10. Conversely, under the principle of up conversion, the inputted light 100 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) 22 found in the energy conversion layer 16. The process of using converted light 102 outputted from one photoluminescent material 22 to excite another, and so on, is generally known as an energy cascade and may serve as an alternative for achieving various color expressions. With respect to either conversion principle, the difference in wavelength between the inputted light 100 and the outputted light 102 is known as the Stokes shift and serves as the principle driving mechanism for an energy conversion process corresponding to a change in wavelength of light. In the various implementations discussed herein, each of the photoluminescent structures 10 may operate under either conversion principle.

The energy conversion layer 16 may be prepared by dispersing the photoluminescent material 22 in a polymer matrix to form a homogenous mixture using a variety of methods. Such methods may include preparing the energy conversion layer 16 from a formulation in a liquid carrier medium 14 and coating the energy conversion layer 16 to a desired substrate 12. The energy conversion layer 16 may be applied to a substrate 12 by painting, screen printing, spraying, slot coating, dip coating, roller coating, and bar coating. Alternatively, the energy conversion layer 16 may be prepared by methods that do not use a liquid carrier medium 14. For example, the energy conversion layer 16 may be rendered by dispersing the photoluminescent material 22 into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material 22 contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protective layer 20 optically coupled and adhered to the stability layer 18 or other layer (e.g., the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAG- NETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

Referring now to FIG. 2, a trim assembly 24 is disposed on a body 26 of a vehicle 28. The body 26 includes a plurality of any number of panels 30, 32, 34, 36, including a fender panel 30 within which a wheel 38 is positioned. In order to permit the wheel 38 to pivot about a vertical axis for steering the vehicle 28 as well as to provide access for changing components of the wheel 38 when necessary, the fender panel 30 is conventionally provided with a curved wheel-well opening 40. The wheel 38 may include a tire 42 disposed circumferentially around a rim 44 of a wheel 38, which may be defined as a cylindrical structure upon which a tire 42 is mounted and which is used with either an integral or a separate wheel disk.

The trim assembly 24 may extend longitudinally along the body 26, including the fender panel 30, for both decorative and protective purposes. Moreover, the trim assembly 24 may have a generally semicylindrical shape corresponding to the wheel-well opening 40 of the fender panel 30 for outlining the curved wheel-well opening 40.

According to one embodiment, the trim assembly 24 may be configured to luminesce in response to excitation by light emitted from a light source 46. The luminescence exhibited by the trim assembly 24 may provide one or more distinct lighting functions. For instance, the trim assembly 24 may luminesce in a first color to function simply as a styling element. In another instance, the trim assembly 24 may luminesce in a second color that is visually distinct from the first color to illuminate a feature, such as the rim 44, of the vehicle 28.

The trim assembly 24 may be configured as an illuminated feature that may be disposed on the vehicle 28 for aesthetic and functional purposes. For example, the trim assembly 24 may be a statically or dynamically illuminated side marker, auxiliary turn signal, decorative feature, and/or any other desired feature. Alternatively, or additionally, illumination may occur as part of a welcome or farewell sequence, meaning that the illumination may occur as an occupant of the vehicle 28 leaves and/or approaches the vehicle 28 employing the trim assembly 24. Alternatively still, the trim assembly 24 may illuminate in a desired color (e.g., red) when the vehicle 28 senses that an action by the occupant is recommended, such as when the tire 42 on the vehicle 28 is underinflated. The trim assembly 24 may then illuminate in a second color (e.g., white) while the occupant changes the tire 42 to provide assistance to the occupant.

It should also be understood that trim assembly 24 may additionally, or alternatively, be provided in other vehicle 28 locations such as, but not limited to, the front, rear, bottom, roof, exterior, and/or interior portions of the vehicle 28. It will also be appreciated that the trim assembly 24 described herein may be utilized for any vehicle 28 such as, but not limited to, coupes, sedans, trucks, sport utility, vans, and the like. Further, it will be appreciated that any lighting system found elsewhere on the vehicle 28 may also be manufactured in accordance with the principles of the present disclosure.

Figure 3:
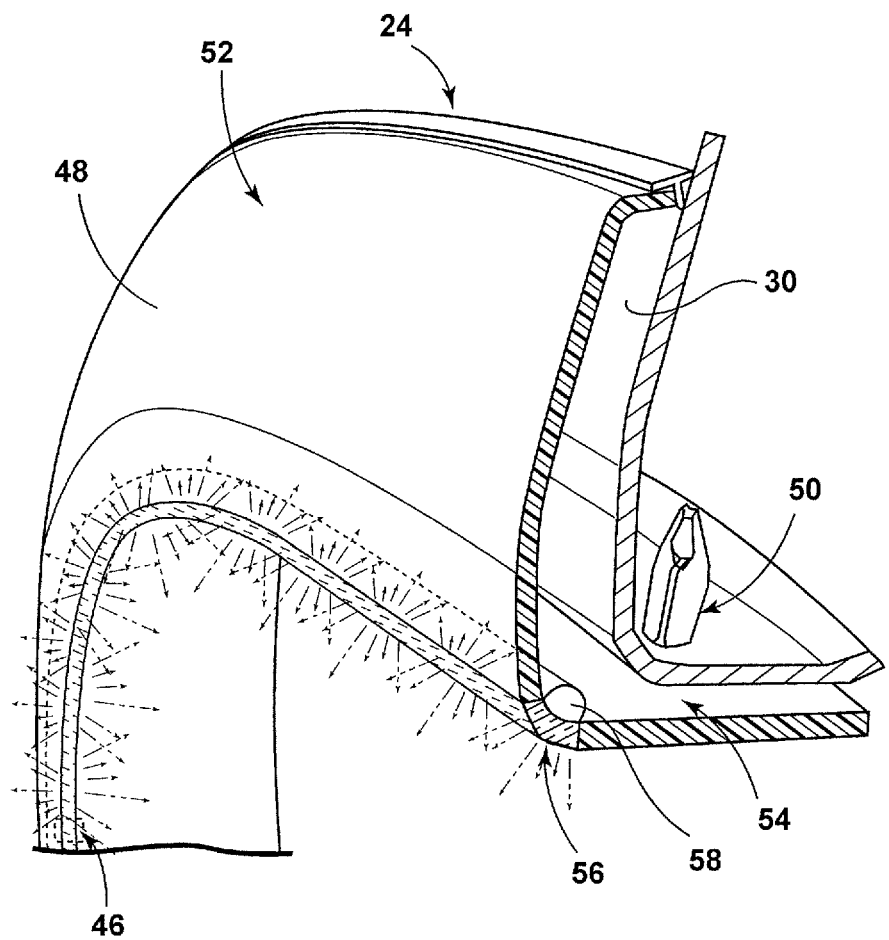
FIG. 3 is a cross-sectional view taken along the line III-III of FIG. 2 illustrating the trim assembly formed from an elongated member and a light guide disposed rearwardly of the member.

As shown in FIG. 3, the trim assembly 24 includes an elongated member 48 that may extend along the body 26 of the vehicle 28 and a mounting member 50 that may be secured to the body 26 by any conventional means, such as through the usage of a fastener or adhesive. The trim assembly 24 may be formed of any practicable material, such as, but not limited to, a polymer or an elastomer. The polymer or elastomer may have excellent mechanical strength, toughness, resiliency, weather resistance, and formability thereby providing a suitable material for protecting a portion of the body 26 of the vehicle 28. For example, polypropylene and polycarbonate may be utilized. Moreover, the member 48 may be formed by injection molding, extrusion, or through any other process known in the art.

The member 48 may include a plurality of portions that may be integrally formed with one another, or later attached thereto. As illustrated, the member 48 includes a first portion 52 that extends substantially upwardly along the vertical portion of the body 26. The member 48 may also include a second portion 54 that extends substantially horizontally into the wheel-well opening 40 of the vehicle 28. A light transmissive portion 56 may be disposed between the first and second portions 52, 54.

The light transmissive portion 56 may be operably coupled with the light source 46 to emit light along the light transmissive portion 56. The light source 46 may comprise any form of light source. For example fluorescent lighting, light emitting diodes (LEDs), organic LEDs (OLEDs), polymer LEDs (PLEDs), solid state lighting, or any other form of lighting.

The light source 46 may be operably coupled with an optical grade light guide 58, which is a substantially transparent or translucent guide suitable for transmitting light. The light guide 58 may be formed from a rigid material that is comprised of a curable substrate such as a polymerizable compound, a mold in clear (MIC) material or mixtures thereof. Acrylates are also commonly used for forming rigid light pipes, as well as poly methyl methacrylate (PMMA), which is a known substitute for glass. A polycarbonate material may also be used in an injection molding process to form the rigid light guide 58.

Further, the light guide 58 may be a flexible light guide 58, wherein a suitable flexible material is used to create the light guide 58. Such flexible materials include urethanes, silicone, thermoplastic polyurethane (TPU), or other like optical grade flexible materials. Whether the light guide 58 is flexible or rigid, the light guide 58, when formed, is substantially optically transparent and/or translucent and capable of transmitting light. The light guide 58 may be referred to as a light pipe, a light plate, a light bar or any other light carrying or transmitting substrate made from a clear or substantially translucent plastic. Known methods of attaching the light guide 58 to the member 48 include the bonding of a preformed light guide 58 to the member 48 by adhesion, such as by using a double-sided tape, or by mechanical connections such as brackets that is formed into the member 48.

Alternatively, the member 48 and light guide 58 may be integrally formed through a multi-shot molding process. Due to fabrication and assembly steps being performed inside the molds, molded multi-material objects allow significant reduction in assembly operations and production cycle times. Furthermore, the product quality can be improved, and the possibility of manufacturing defects, and total manufacturing costs can be reduced. In multi-material injection molding, multiple different materials are injected into a multi-stage mold. The sections of the mold that are not to be filled during a molding stage are temporally blocked. After the first injected material sets, then one or more blocked portions of the mold are opened and the next material is injected. This process continues until the required multi-material part is created.

According to one embodiment, a multi-shot molding process is used to create portions of the light guide 58, which may be integrally formed with the light source 46. Additional optics 134 (FIG. 6) may also be molded into the light guide 58 during the multi-material injection molding process. Initially, the trim assembly 24 is formed through a first injection molding step, or through successive steps, if necessary. A light guide 58 is then molded and coupled to the member 48 in a second injection molding step. Lastly, the light source 46, conductive leads 86, 88 (FIG. 9A), a printed circuit board (PCB) 90 (FIG. 7), and/or a heat sink is placed into the mold and thereby proximately disposed to the member 48 and light guide 58 through injection molding or any other known attachment method, such as vibration welding. Integrally forming portions of the light guide 58, while encapsulating the light source 46, and portions of the PCB 90 and/or conductive leads 86, 88, may protect the light guide 58 and/or additional components from physical and chemical damage arising from environmental exposure.

In alternative embodiments, additional components may be added during one of the injection steps, or successively added in additional injections to adhere more components to the member 48. In some embodiments, the light guide 58 may have a photoluminescent material 22 applied thereto.

Figure 4:
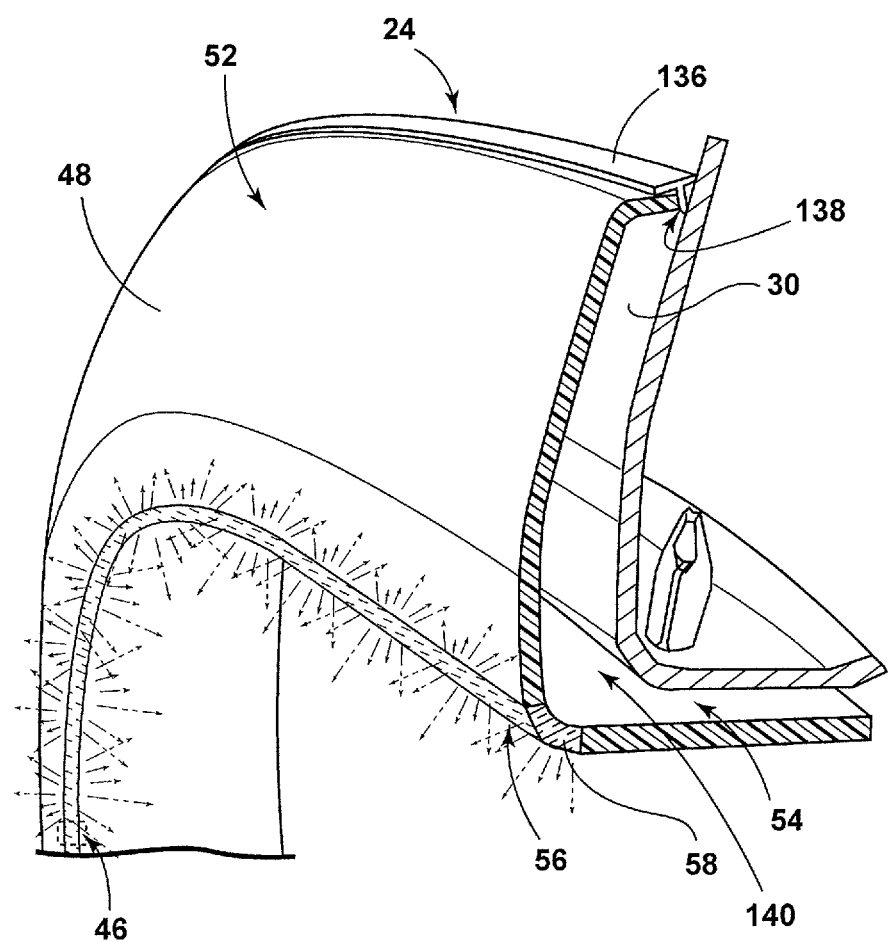
FIG. 4 is a cross-sectional view taken along the line III-III of FIG. 2 illustrating the member having the light guide disposed between a pair of opaque portions of the member.

Referring to FIG. 4, the transmissive portion of the member 48 may be an integrally formed light guide 58. Thus, a separate component disposed behind the light transmissive portion 56 may not be necessary. The light transmissive portion 56 may be constructed in accordance with the characteristics of the light guide 58 described above.

The trim assembly 24 may also include a seal 136 disposed at an end surface 138 of the member 48. The seal 136 may be configured to prevent debris, such as water, dirt, etc., from entering an area 140 between the trim assembly 24 and the body 26 of the vehicle 28. The seal 136 may be an additional component, or the trim assembly 24 may be configured such that the seal 136 is integrally formed with the member 48.

Figure 5:
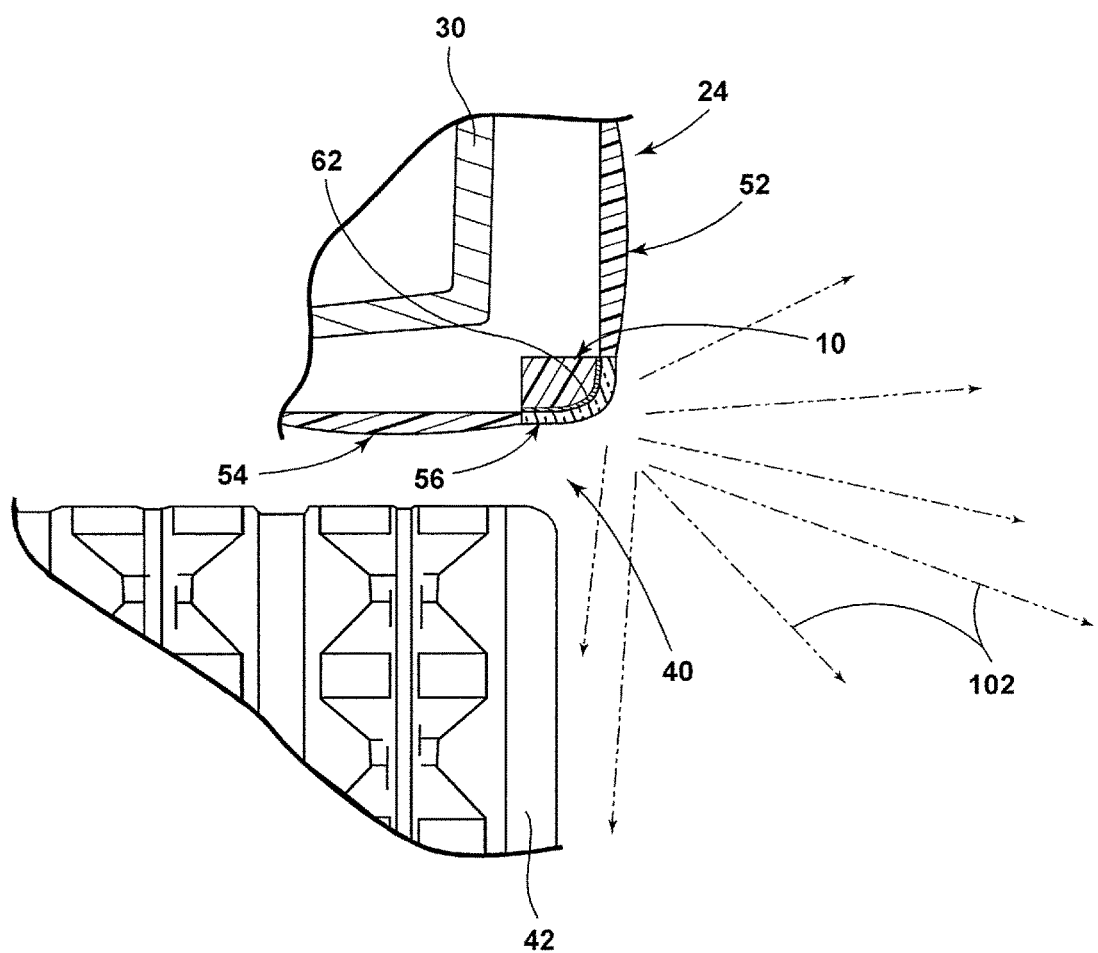
FIG. 5 is a cross-sectional view taken along the line V-V of FIG. 2 illustrating one embodiment of the member having a light transmissive portion separating first and second portions and a light guide disposed rearwardly of the light transmissive portion.

With reference to FIG. 5, the member 48 includes the light transmissive portion 56 disposed between the first and second opaque portions and the light guide 58 disposed rearwardly of the member 48. A light diffuser 62 may be molded, or alternatively mounted, between the member 48 and the light guide 58. For example, the light diffuser 62 may be a layer that is applied to a surface of the member 48 via partial vacuum deposition. The diffuser 62 can be transparent or translucent and generally functions to diffuse the light from the light guide 58 so that hot spots and/or shadows are substantially eliminated. Additionally, or alternatively, the diffuser 62 may be applied to a portion of the light guide 58 in order to optimize the light diffusing effect. According to one embodiment, the diffuser 62 has a cloudy, white color that substantially conceals the photoluminescent structure 10 within the trim assembly 24.

With further reference to FIG. 5, according to the illustrated embodiment, the photoluminescent structure 10 may be disposed within the light guide 58. Accordingly, inputted light 100 emitted from the light source 46 may be converted from a first, inputted wavelength to a second, outputted wavelength as the light travels through the light guide 58. The outputted light 102 may be directed towards the wheel-well opening 40 and/or outwardly from the vehicle 28 through a portion of the light transmissive portion 56.

The photoluminescent structure 10 may include a photoluminescent material 22, as described above, which is configured to convert inputted light 100 received from light source 46 into an outputted light 102 having a wavelength different than that associated with the inputted light 100. More specifically, the photoluminescent material 22 is formulated to have an absorption spectrum that includes the emission wavelength of the inputted light 100 supplied from the light source 46. The photoluminescent material 22 is also formulated to have a Stokes shift resulting in the converted visible light 102 having an emission spectrum expressed in a desired color, which may vary depending on the lighting application. The converted visible outputted light 102 is outputted from the trim assembly 24 from the light transmissive portion 56 in the desired color.

In one embodiment, the energy conversion process is undertaken by way of down conversion, whereby the inputted light 100 includes light on the lower end of the visible spectrum such as blue, violet, or ultraviolet (UV) light. Doing so enables blue, violet, or UV LEDs to be used as the light source 46, which may offer a relative cost advantage over simply using LEDs of the desired color and foregoing the energy conversion process altogether. Furthermore, the illumination provided by the trim assembly 24 may offer a unique, substantially uniform, and/or attractive viewing experience that may be difficult to duplicate through non-photoluminescent means. It should be appreciated that the photoluminescent structure 10 may be disposed on or in other portions of the light guide 58 and may be disposed both on and in the light guide 58 thereon to illuminate in any desired combined color.

Figure 6:
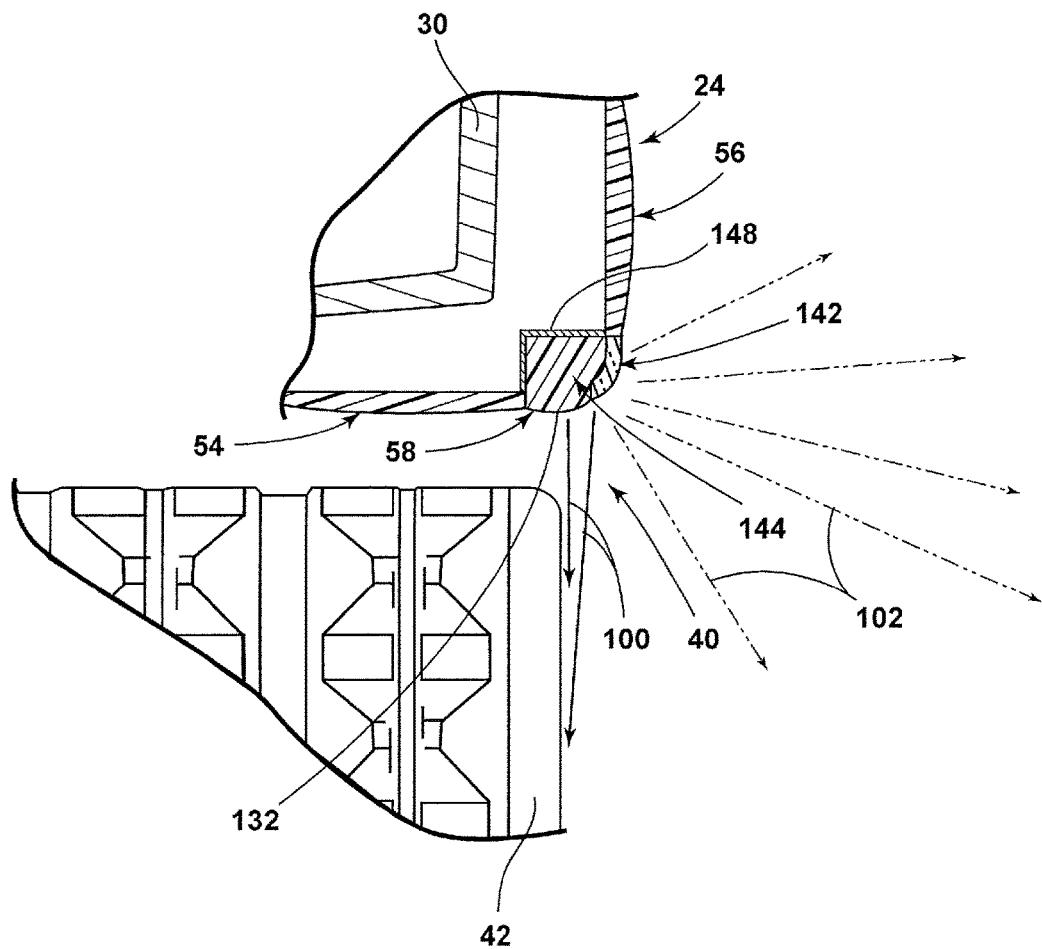
FIG. 6 is a cross-sectional view taken along the line V-V of FIG. 2 illustrating another embodiment of the member that includes an integrally formed light guide that is configured to emit light converted by a photoluminescent structure and non-converted light.
Figure 7:
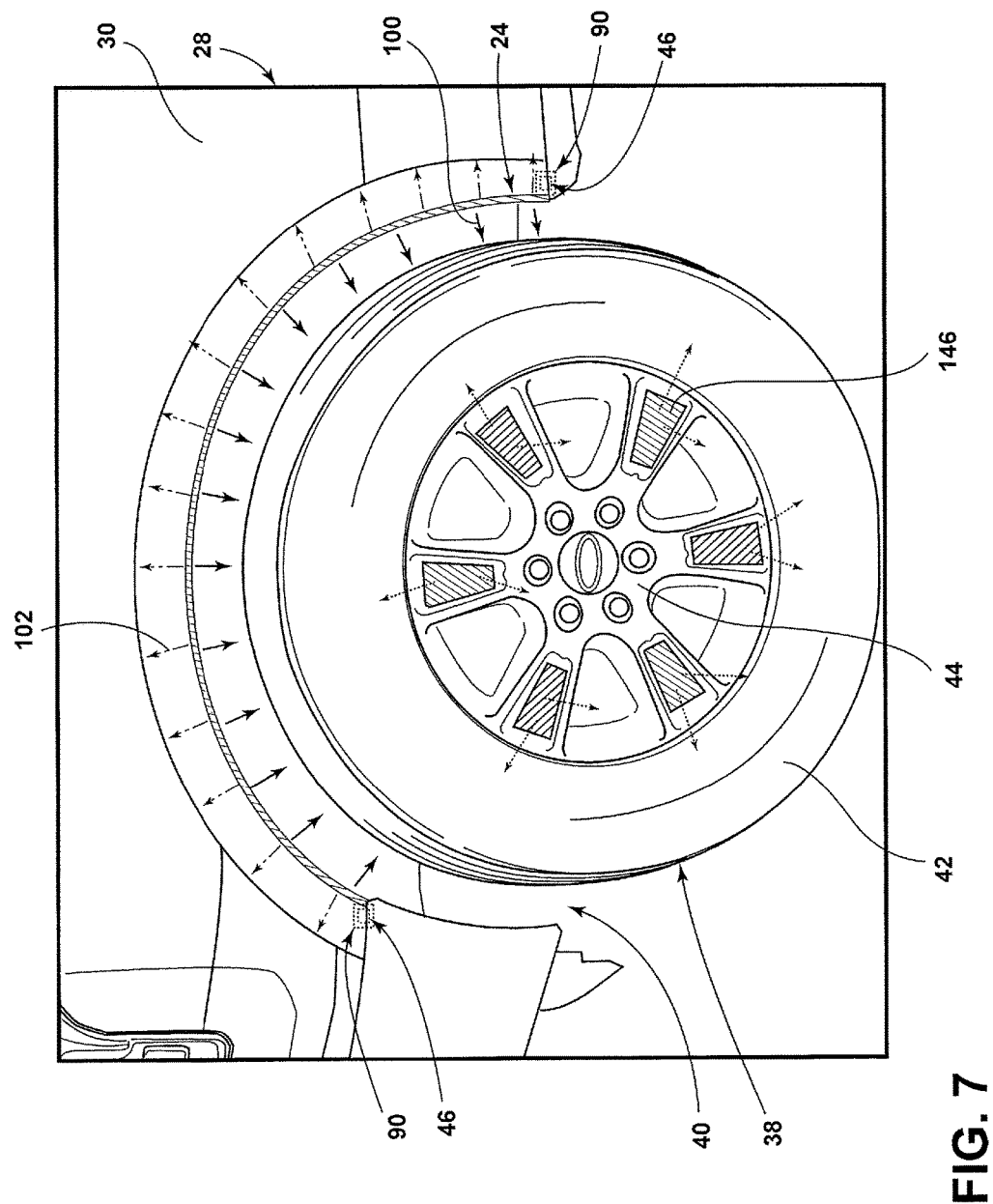
FIG. 7 is a partial side view of a vehicle having the trim assembly disposed around the wheel-well and a photoluminescent structure of the wheel of the vehicle.

Referring to FIGS. 6 and 7, the light guide 58 separates the first and second opaque portions of the member 48. The light guide 58 may include a first portion 142 that has a first photoluminescent structure 10 therein and/or thereon. The first portion 142 of the light guide 58 may be configured to convert inputted light 100 into an outputted light 102, as described herein. A second portion 144 of the light guide 58 may be configured to emit inputted light 100 in a second direction towards a second photoluminescent structure 146 disposed proximately to the trim assembly 24. For example, the second photoluminescent structure 146 may be disposed on the rim 44 and/or the tire 42 of the vehicle 28. The second photoluminescent structure 146 may include a single photoluminescent material 22, or may include a plurality of photoluminescent materials 22.

With reference to FIG. 6, the light guide 58 may include a reflective layer 148 on a portion thereof to prevent light emitted from the light source 46 from exiting a portion of the light guide 58. The light reflective layer 148 may be any material that directs light in a desired direction and/or prevents light leakage through desired portions of the light guide 58 and includes, but is not limited to, paint that may be applied to desired portions of the light guide 58.

As shown in FIG. 7, the trim assembly 24 may include a plurality of light sources 46 that may emit inputted light 100 at varying wavelengths. The second photoluminescent structure may include a plurality of photoluminescent materials 22 that emit varying colors of outputted light 102 based on the varying inputted wavelengths. Accordingly, the wheel 38 may illuminate in a plurality of colors based on the light source 46 that is activated.

Alternatively, the light source 46 may emit inputted light 100 at the same frequency as the rotation of the wheel 38 such that portions of the wheel 38 are illuminated in a predefined pattern. For example, a single spoke on the rim 44 may be illuminated upon each rotation such that indicia thereon may be displayed in upward orientation upon illumination. Alternatively, the light source(s) 46 may pulsate varying wavelengths of light intermittently to independently excite a plurality of photoluminescent structures 10 at varying times. The intermittent pulsating of varying inputted wavelengths may occur in accordance with any vehicle function.

To better direct light towards the desired location, optics 134 may be utilized. The optics 134 may be integrally molded with the trim assembly 24 and/or the light guide 58. Alternatively, the optics 134 may be laser etched or formed in any other manner known in the art.

Figure 8:
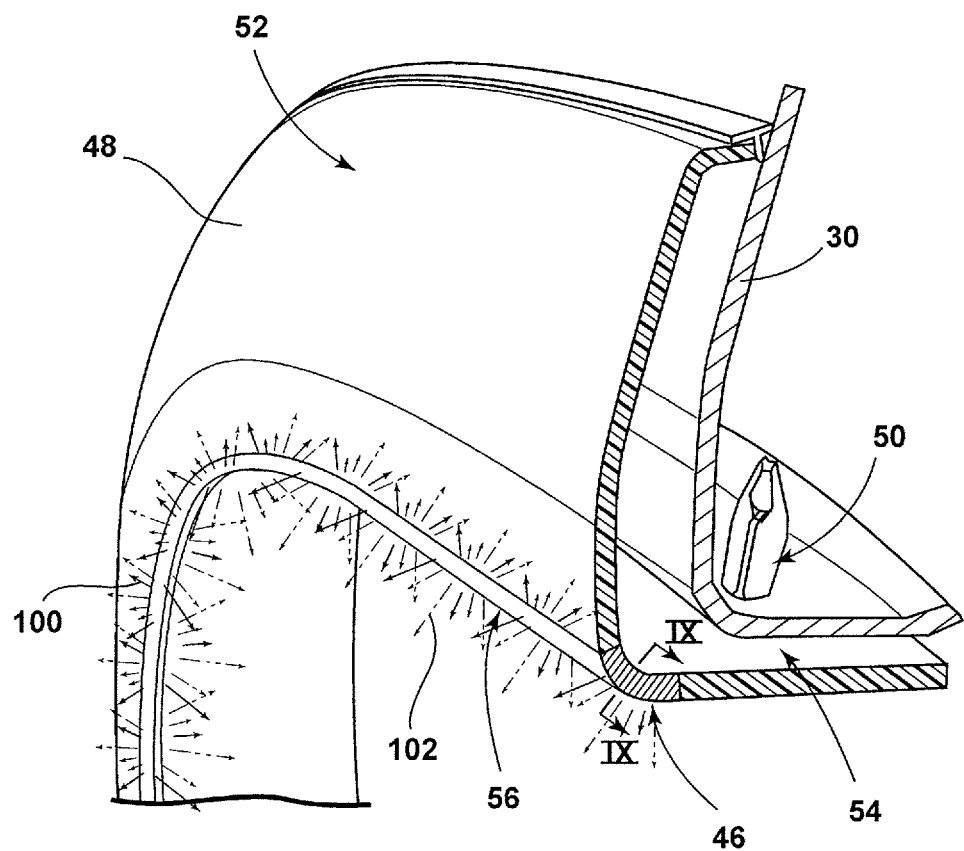
FIG. 8 is a cross-sectional view taken along the line III-III of FIG. 2 illustrating the member having a light-producing assembly therein.

Referring to FIG. 8, the trim assembly 24 is illustrated, according to one embodiment, having a light source 46 disposed between the first and second opaque portions. The light source 46 may be integrally formed between the first and second opaque portions, or the first and second portions 52, 54 may be later attached to the light source 46.

Figure 9A:
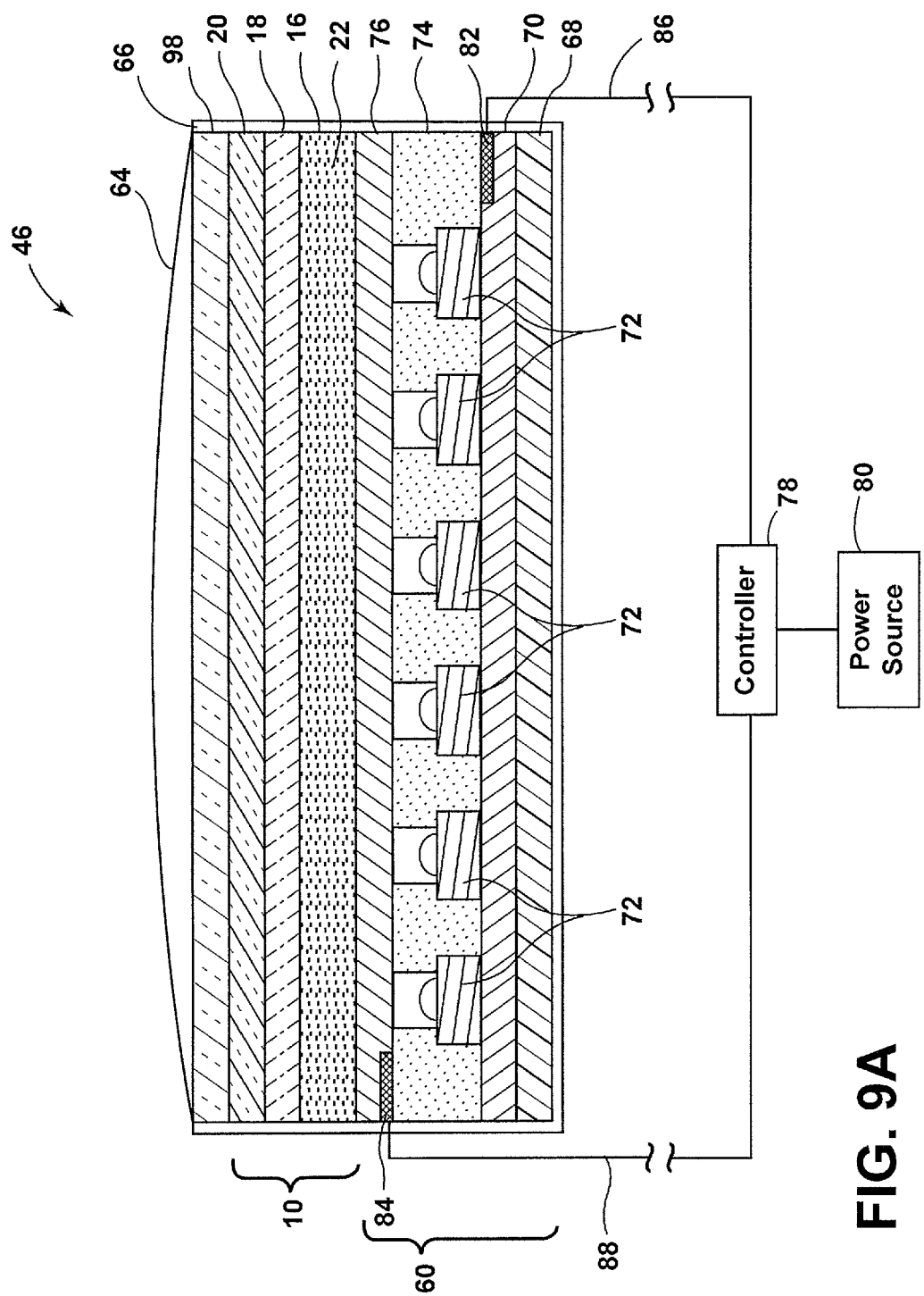
FIG. 9A is a cross-sectional view taken along line IX-IX of FIG. 8 illustrating a light source according to one embodiment.

Referring to FIGS. 9A-9E, a cross-sectional view of the light source 46 capable of use on a vehicle 28 with an external photoluminescent structure 10 is shown according to one embodiment. As illustrated in FIG. 9A, the light source 46 may have a stacked arrangement that includes a light-producing assembly 60, a photoluminescent structure 10, a viewable portion 64, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a substrate 12 as its lowermost layer. The substrate 12 may include a polycarbonate, poly-methyl methacrylate (PMMA), or polyethylene terephthalate (PET) material on the order of 0.005 to 0.060 inches thick and is arranged over the intended vehicle substrate 12 on which the light source 46 is to be received (e.g., the member 48). Alternatively, as a cost saving measure, the substrate 12 may directly correspond to a preexisting structure (e.g., a portion of the member 48, a portion of the body 26, etc.).

The light-producing assembly 60 includes a positive electrode 70 arranged over the substrate 12. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84 may also be placed in any orientation such that the light-producing assembly 60 may emit outputted light 102 towards a desired location.

The LED sources 72 may be dispersed in a random or controlled fashion within the semiconductor ink 74 and may be configured to emit focused or non-focused light toward the photoluminescent structure 10. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies 60 is disclosed in U.S. Patent Publication No. 2014/0264396 A1 to Lowenthal et al. entitled "ULTRA-THIN PRINTED LED LAYER REMOVED FROM SUBSTRATE," filed Mar. 12, 2014, the entire disclosure of which is incorporated herein by reference.

Referring still to FIG. 9A, the photoluminescent structure 10 is arranged over the negative electrode 76 as a coating, layer, film or other suitable deposition. With respect to the presently illustrated embodiment, the photoluminescent structure 10 may be arranged as a multi-layered structure including an energy conversion layer 16, optional stability layer 18, and optional protective layer 20, as described above.

The viewable portion 64 is arranged over the photoluminescent structure 10. In some embodiments, the viewable portion 64 may include a plastic, silicon, or urethane material and is molded over the photoluminescent structure 10 and light-producing assembly 60. Preferably, the viewable portion 64 should be at least partially light transmissible. In this manner, the viewable portion 64 will be illuminated by the photoluminescent structure 10 whenever an energy conversion process is underway. Additionally, by over-sealing the viewable portion 64, it may also function to protect the photoluminescent structure 10 and the light-producing assembly 60. The viewable portion 64 may be arranged in a planar shape and/or an arcuate shape to enhance its viewing potential. Like the photoluminescent structure 10 and the light-producing assembly 60, the viewable portion 64 may also benefit from a thin design, thereby helping to fit the light source 46 into small package spaces of the vehicle 28.

In some embodiments, a decorative layer 98 may be disposed between the viewable portion 64 and the photoluminescent structure 10. The decorative layer 98 may include a polymeric material or other suitable material and is configured to control or modify an appearance of the viewable portion 64 of the light source 46. For example, the decorative layer 98 may be configured to confer an appearance of a trim component on the vehicle 28 to the viewable portion 64 when the viewable portion 64 is in an unilluminated state. In other embodiments, the decorative layer 98 may be tinted any color to complement the body 26 of the vehicle 28. In any event, the decorative layer 98 should be at least partially light transmissible such that the photoluminescent structure 10 is not prevented from illuminating the viewable portion 64 whenever an energy conversion process is underway.

The overmold material 66 is disposed around the light-producing assembly 60 and/or photoluminescent structure 10. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the environmental containments, such as dirt and water that may come in contact with the body 26 of the vehicle 28. It is also contemplated that the viewable portion 64 may be formed by a portion of the overmold material 66. According to one embodiment, the overmold material 66 may be the portions of the member 48 that surround the light-producing assembly 60.

In some embodiments, the photoluminescent structure 10 may be employed separate and away from the light-producing assembly 60. For example, the photoluminescent structure 10 may be positioned on the rim 44, the tire 42, and/or any surface proximate, but not in physical contact with, the light-producing assembly 60. It should be understood that in embodiments where the photoluminescent structure 10 is incorporated into distinct components separated from the light source 46, the light source 46 might still have the same or similar structure to the light source 46 described in reference to FIG. 9A.

Figure 9B:
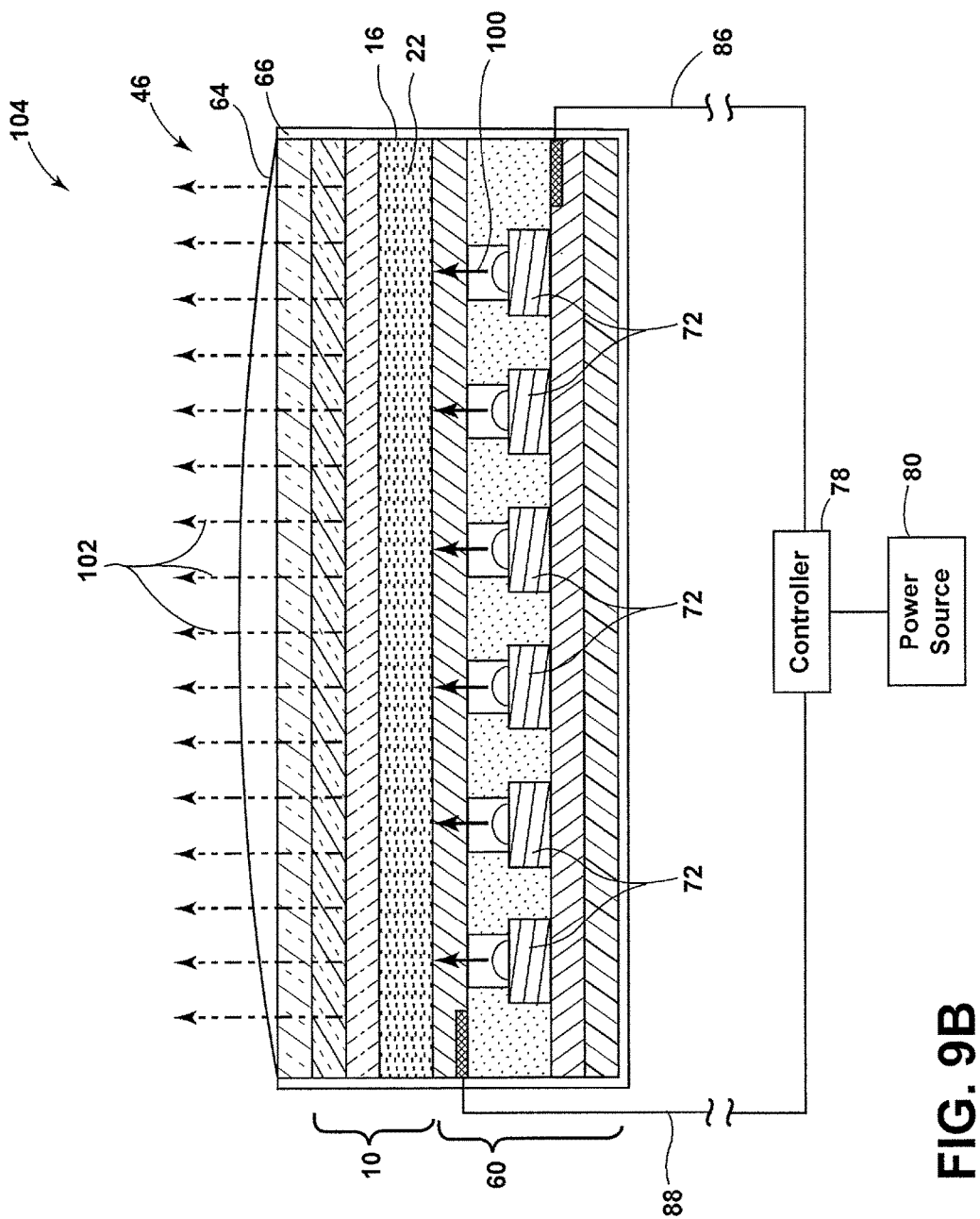
FIG. 9B is a cross-sectional view taken along line IX-IX of FIG. 8 further illustrating an the light source, according to one embodiment.

Referring to FIG. 9B, an energy conversion process 104 for producing single color luminescence is illustrated according to one embodiment. For purposes of illustration, the energy conversion process 104 is described below using the light source 46 depicted in FIG. 9A. In this embodiment, the energy conversion layer 16 of the photoluminescent structure 10 includes a single photoluminescent material 22, which is configured to convert inputted light 100 received from LED sources 72 into an outputted light 102 having a wavelength different than that associated with the inputted light 100. More specifically, the photoluminescent material 22 is formulated to have an absorption spectrum that includes the emission wavelength of the inputted light 100 supplied from the LED sources 72. The photoluminescent material 22 is also formulated to have a Stokes shift resulting in the converted visible light 102 having an emission spectrum expressed in a desired color, which may vary per lighting application. The converted visible light 102 is outputted from the light source 46 via the viewable portion 64, thereby causing the viewable portion 64 to illuminate in the desired color. The illumination provided by the viewable portion 64 may offer a unique, substantially uniform, and/or attractive viewing experience that may be difficult to duplicate through non-photoluminescent means.

Figure 9C:
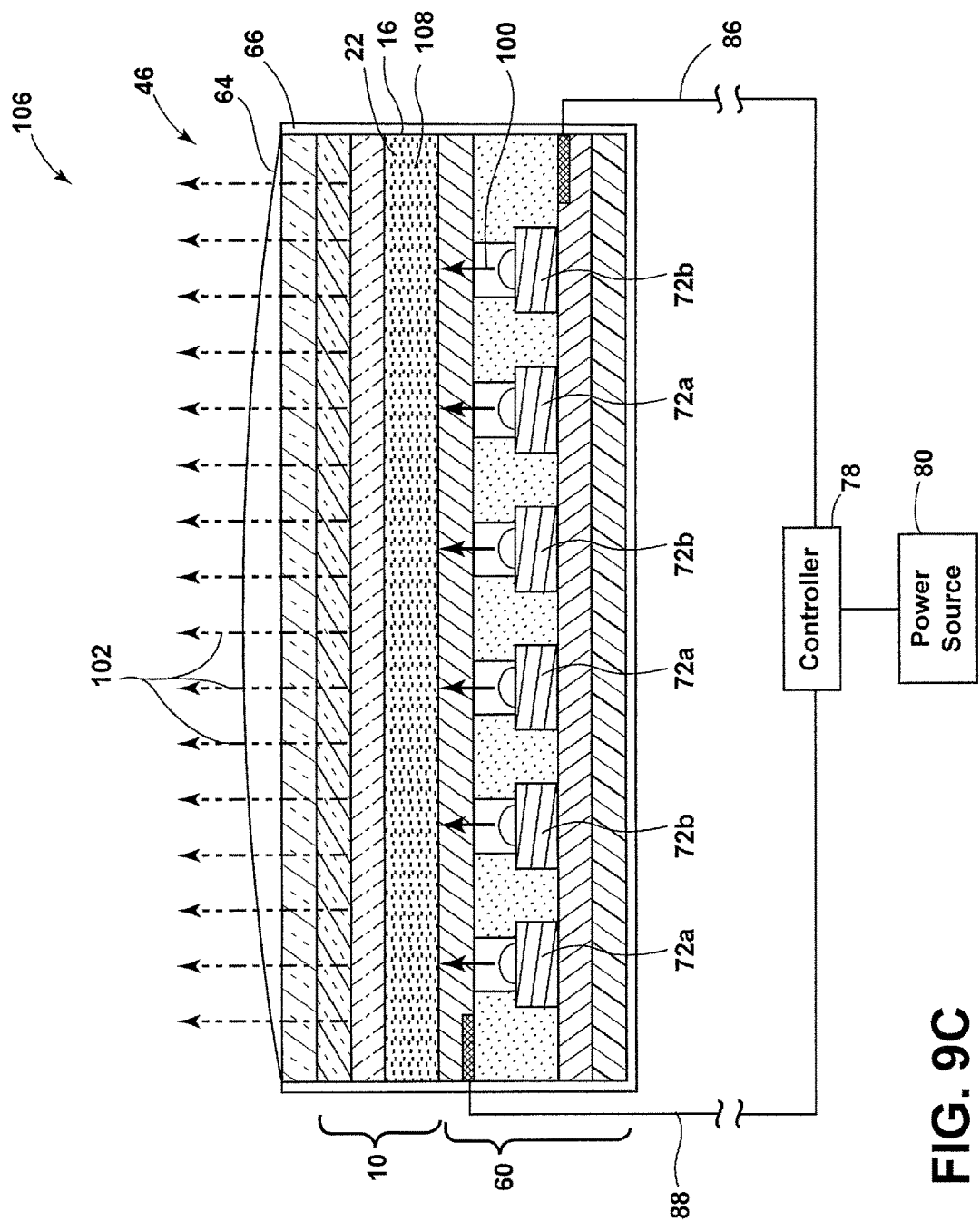
FIG. 9C is a cross-sectional view taken along line IX-IX of FIG. 8 illustrating an alternate light source, according to one embodiment.

Referring to FIG. 9C, a second energy conversion process 106 for generating multiple colors of light is illustrated according to one embodiment. For consistency, the second energy conversion process 106 is also described below using the light source 46 depicted in FIG. 9A. In this embodiment, the energy conversion layer 16 includes the first and second photoluminescent materials 22, 108 that are interspersed within the energy conversion layer 16. Alternatively, the photoluminescent materials 22, 108 may be isolated from each other if desired. Also, it should be appreciated that the energy conversion layer 16 may include more than two different photoluminescent materials 22 and 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 22, 108 is mutually exclusive. That is, photoluminescent materials 22, 108 are formulated to have non-overlapping absorption spectrums and Stoke shifts that yield different emission spectrums. Also, in formulating the photoluminescent materials 22, 108, care should be taken in choosing the associated Stoke shifts such that the converted light 102 emitted from one of the photoluminescent materials 22, 108, does not excite the other, unless so desired. According to one exemplary embodiment, a first portion of the LED sources 72, exemplarily shown as LED sources 72a, is configured to emit an inputted light 100 having an emission wavelength that only excites photoluminescent material 22 and results in the inputted light 100 being converted into a visible light 102 of a first color (e.g., white). Likewise, a second portion of the LED sources 72, exemplarily shown as LED sources 72b, is configured to emit an inputted light 100 having an emission wavelength that only excites second photoluminescent material 108 and results in the inputted light 100 being converted into a visible light 102 of a second color (e.g., red). Preferably, the first and second colors are visually distinguishable from one another. In this manner, LED sources 72a and 72b may be selectively activated using the controller 78 to cause the photoluminescent structure 10 to luminesce in a variety of colors. For example, the controller 78 may activate only LED sources 72a to exclusively excite photoluminescent material 22, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 22, 108 to become excited, resulting in the viewable portion 64 illuminating in a third color, which is a color mixture of the first and second color (e.g., pinkish). The intensities of the inputted light 100 emitted from each light source 46 may also be proportionally varied to one another such that additional colors may be obtained. For energy conversion layers 16 containing more than two distinct photoluminescent materials 22, a greater diversity of colors may be achieved. Contemplated colors include red, green, blue, and combinations thereof, including white, all of which may be achieved by selecting the appropriate photoluminescent materials 22 and correctly manipulating the corresponding LED sources 72.

Figure 9D:
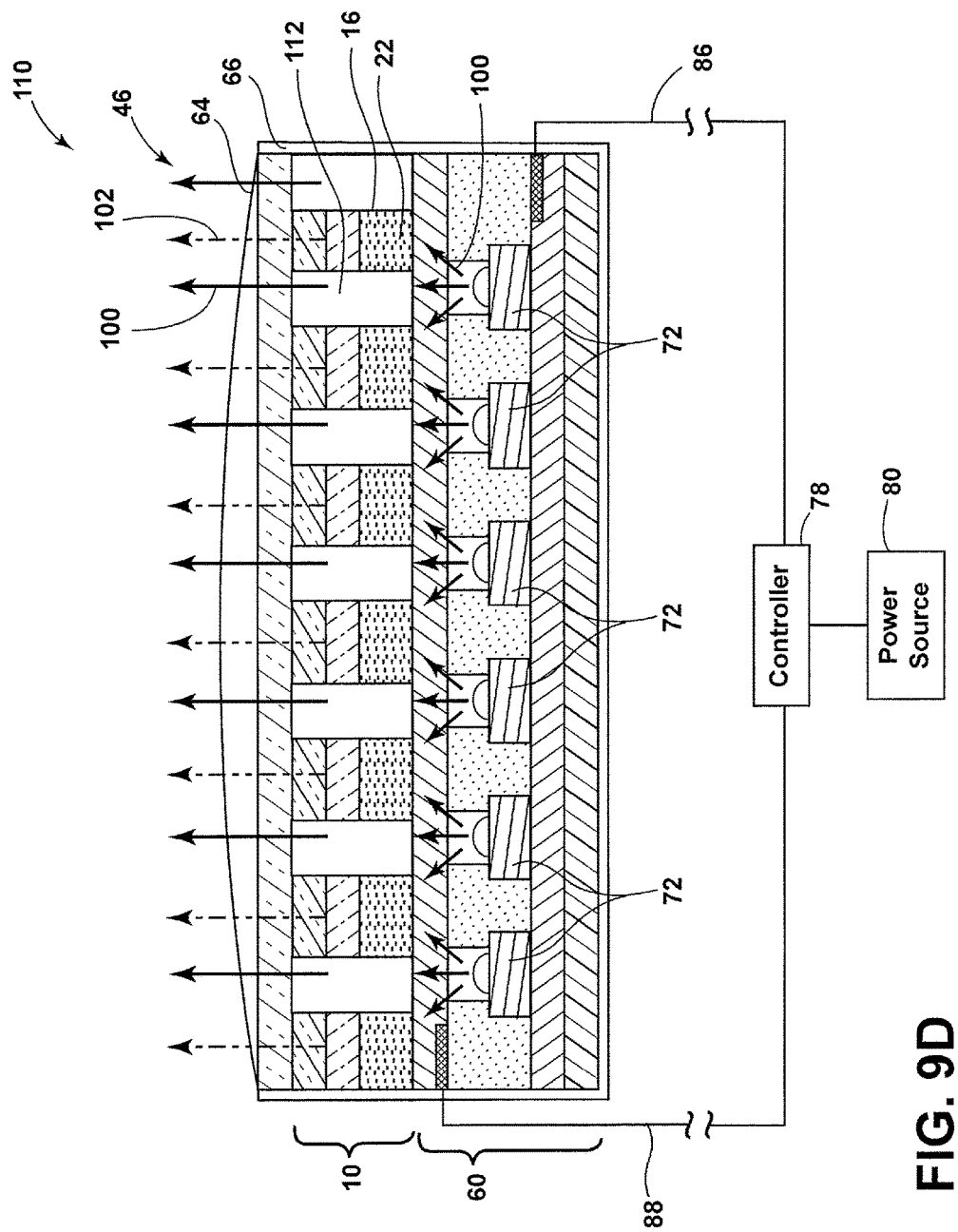
FIG. 9D is a cross-sectional view taken along line IX-IX of FIG. 8 illustrating a light source having a luminescent structure separated by light transmissive portions disposed on the light source, according to one embodiment.

Referring to FIG. 9D, a third energy conversion process 110 includes a light-producing assembly 60, such as the one described in reference to FIG. 9A, and a photoluminescent structure 10 disposed thereon is illustrated, according to an alternate embodiment. The photoluminescent structure 10 is configured to convert inputted light 100 received from LED sources 72 into a visible light 102 having a wavelength different than that associated with the inputted light 100. More specifically, the photoluminescent structure 10 is formulated to have an absorption spectrum that includes the emission wavelength of the inputted light 100 supplied from the LED sources 72. The photoluminescent material 22 is also formulated to have a Stokes shift resulting in the converted visible light 102 having an emission spectrum expressed in a desired color, which may vary per lighting application.

The photoluminescent structure 10 may be applied to a portion of the light-producing assembly 60, for example, in a stripped manner. Between the photoluminescent structures 10 may be light transmissive portions 112 that allow inputted light 100 emitted from the LED sources 72 to pass therethrough at the first wavelength. The light transmissive portions 112 may be an open space, or may be a transparent or translucent material. The light 100 emitted through the light transmissive portions 112 may be directed from the light-producing assembly 60 towards a second photoluminescent structure 10 disposed proximate to the light-producing assembly 60. The second photoluminescent structure 10 may be configured to luminesce in response to the inputted light 100 that is directed through the light transmissive portions 112.

Figure 9E:
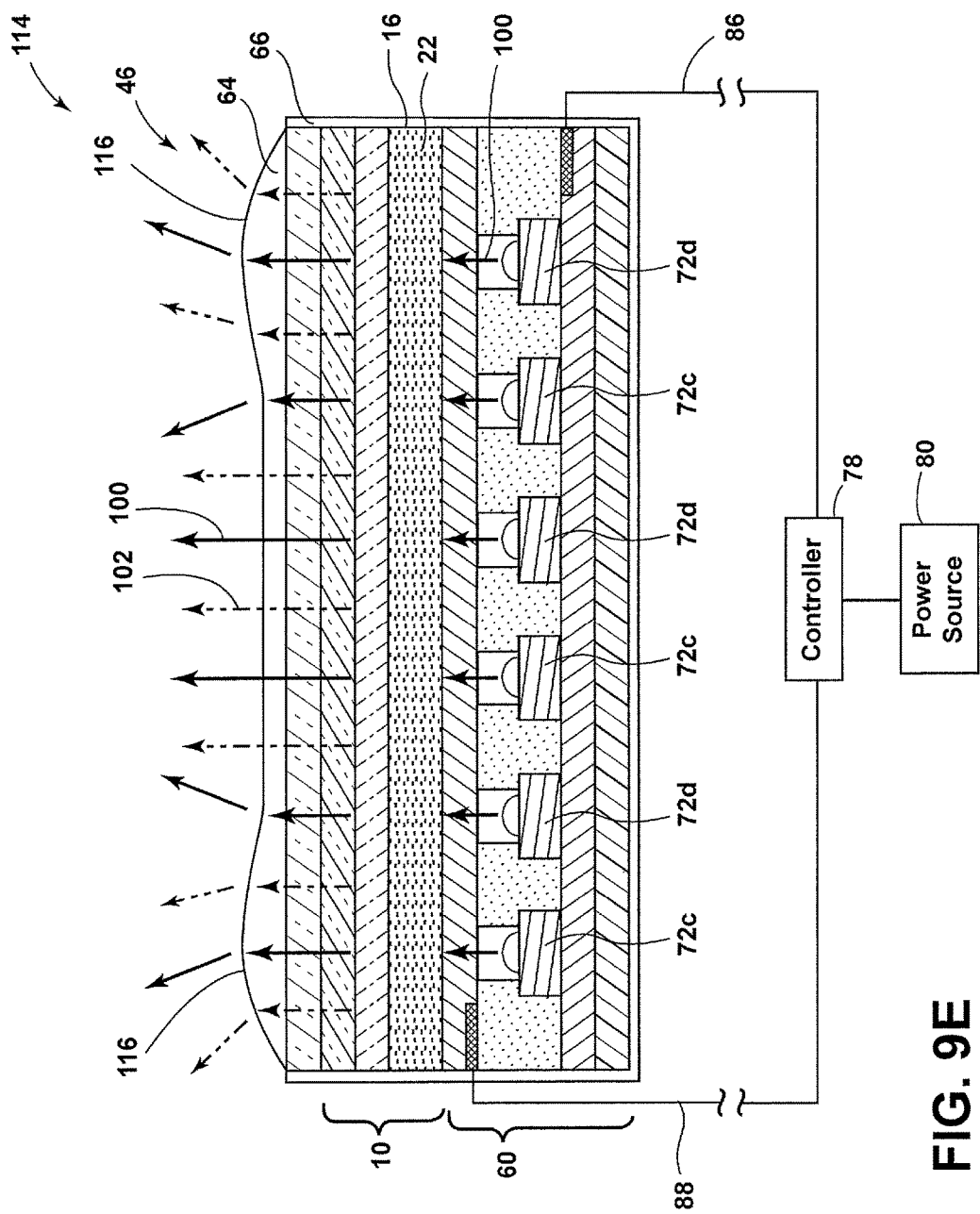
FIG. 9E is a cross-sectional view taken along line IX-IX of FIG. 8 illustrating an alternate light source having a luminescent structure disposed on the light source configured to convert a portion of light emitted from the light source from a first wavelength to a second wavelength, according to one embodiment.

Referring to FIG. 9E, a fourth energy conversion process 114 for generating multiple colors of light utilizing the light-producing assembly 60, such as the one described in reference to FIG. 9A, and a photoluminescent structure 10 disposed thereon is illustrated. In this embodiment, the photoluminescent structure 10 is disposed over a top portion of the light-producing assembly 60. The excitation of photoluminescent material 22 is formulated such that a portion of inputted light 100 emitted from the LED sources 72 passes through the photoluminescent structure 10 at the first wavelength (i.e., the inputted light 100 emitted from the light source 46 is not converted by the photoluminescent structure 10). The intensity of the emitted light (i.e., the combination of the inputted light 100 and outputted light 102) may be modified by pulse-width modulation or current control to vary the amount of inputted light 100 emitted from the LED sources 72 that passes through the photoluminescent structure 10 without converting to a second, outputted 102 wavelength. For example, if the light source 46 is configured to emit light 100 at a low level, substantially all of the light 100 may be converted to outputted light 102. In this configuration, a color of light 102 corresponding to the photoluminescent structure 10 may be emitted from the light-producing assembly 60. If the light source 46 is configured to emit inputted light 100 at a high level, only a portion of the first wavelength may be converted by the photoluminescent structure 10. In this configuration, a first portion of the emitted light may be converted by the photoluminescent structure 10 and a second portion of the emitted light may be emitted from the light-producing assembly 60 at the first wavelength towards additional photoluminescent structures 158 disposed proximately to the light source 46. The additional photoluminescent structures 158 may luminesce in response to the light 100 emitted from the light source 46.

According to one exemplary embodiment, a first portion of the LED sources 72, exemplarily shown as LED sources 72a is configured to emit an inputted light 100 having a wavelength that excites the photoluminescent material 22 within the photoluminescent structure 10 and results in the inputted light 100 being converted into a visible light 102 of a first color (e.g., white). Likewise, a second portion of the LED sources 72, exemplarily shown as LED sources 72c, is configured to emit an inputted light 100 having a wavelength that passes through the photoluminescent structure 10 and excites additional photoluminescent structures 158 disposed proximately to the trim assembly 24 thereby illuminating in a second color. The first and second colors may be visually distinguishable from one another. In this manner, LED sources 72a and 72c may be selectively activated using the controller 78 to cause the trim assembly 24 to luminesce in a variety of colors.

The light-producing assembly 60 may also include optics 116 that are configured to direct light 100 emitted from the LED sources 72a, 72c and the light 102 emitted from the photoluminescent structure 10 towards pre-defined locations. For example, inputted light 100 emitted from the LED sources 72a, 72c and the photoluminescent structure 10 may be directed and/or focused towards a desired feature and/or location proximate to the light source 46.

Referring to FIG. 9, a light-producing assembly 60, according to one embodiment, is illustrated from a top view having varying types and concentrations of LED sources 72a, 72d transversely along the light-producing assembly 60. As illustrated, a first portion 118 of the light-producing assembly 60 includes LED sources 72a that are configured to emit an inputted light 100 having an emission wavelength in a first color (e.g., red) spectrum. Likewise, a second portion 120 of the light-producing assembly 60 includes LED sources 72d that are configured to emit an inputted light 100 having an emission wavelength in a second color (e.g., orange) spectrum. The first and second portions 118, 120 of the light-producing assembly 60 may be separated by insulative, or non-conductive, barriers 122 from proximately disposed portions through any means known in the art such that each portion 118, 120 may be illuminated independently of any other portion 118, 120. The insulative barriers 122 may also prevent a substantial amount of inputted light 100 from proximately illuminated LED sources 72a, 72d from crossing through the insulative barrier 122. Further, each portion 118, 120 disposed within the light-producing assembly 60 may include a respective bus bar 82, 84, 124, 126, 128, 130, 132 coupled to the controller 78 and configured to illuminate each respective portion 118, 120.

According to one embodiment, the first and second colors are visually distinguishable from one another. In this manner, LED sources 72a and 72d may be selectively activated using the controller 78 to cause the LED sources 72a, 72d to illuminate in a variety of colors. For example, the controller 78 may activate only LED sources 72a to exclusively illuminate a portion 118 of the light-producing assembly 60 in the first color. Alternatively, the controller 78 may activate only LED sources 72d to exclusively illuminate a portion 120 of the light-producing assembly 60 in the second color. It should be appreciated that the light-producing assembly 60 may include any number of portions 118, 120 having varying LED sources 72a, 72d that may illuminate in any desired color. Moreover, it should also be appreciated that the portions having varying LED sources 72a, 72d may be orientated in any practicable manner and need not be disposed adjacently.

As described above, a photoluminescent structure 10 may be disposed on a portion of the light-producing assembly 60. If desired, any of the LED sources 72a, 72d may be utilized for exciting any photoluminescent material 22 disposed proximately to and/or above the light-producing assembly 60.

The semiconductor ink 74 may also contain various concentrations of LED sources 72a, 72d such that the density of the LED sources 72a, 72d, or number of LED sources 72a, 72d per unit area, may be adjusted for various lighting applications. In some embodiments, the density of LED sources 72a, 72d may vary across the length of the light-producing assembly 60. For example, a first portion 118 of the light-producing assembly 60 may have a greater density of LED sources 72 than alternate portions 120, or vice versa. In such embodiments, the light source 46 and/or the indicia may appear brighter or have a greater luminance in order to preferentially illuminate pre-defined locations. In other embodiments, the density of LED sources 72a, 72d may increase or decrease with increasing distance from a preselected point.

According to one embodiment, the light-producing assembly 60 includes a higher concentration of LED sources 72a in the second portion 120 such that the second portion 120 may illuminate as a side marker, or turn indicator, while the first portion 118 provides ambient lighting.

Figure 10:
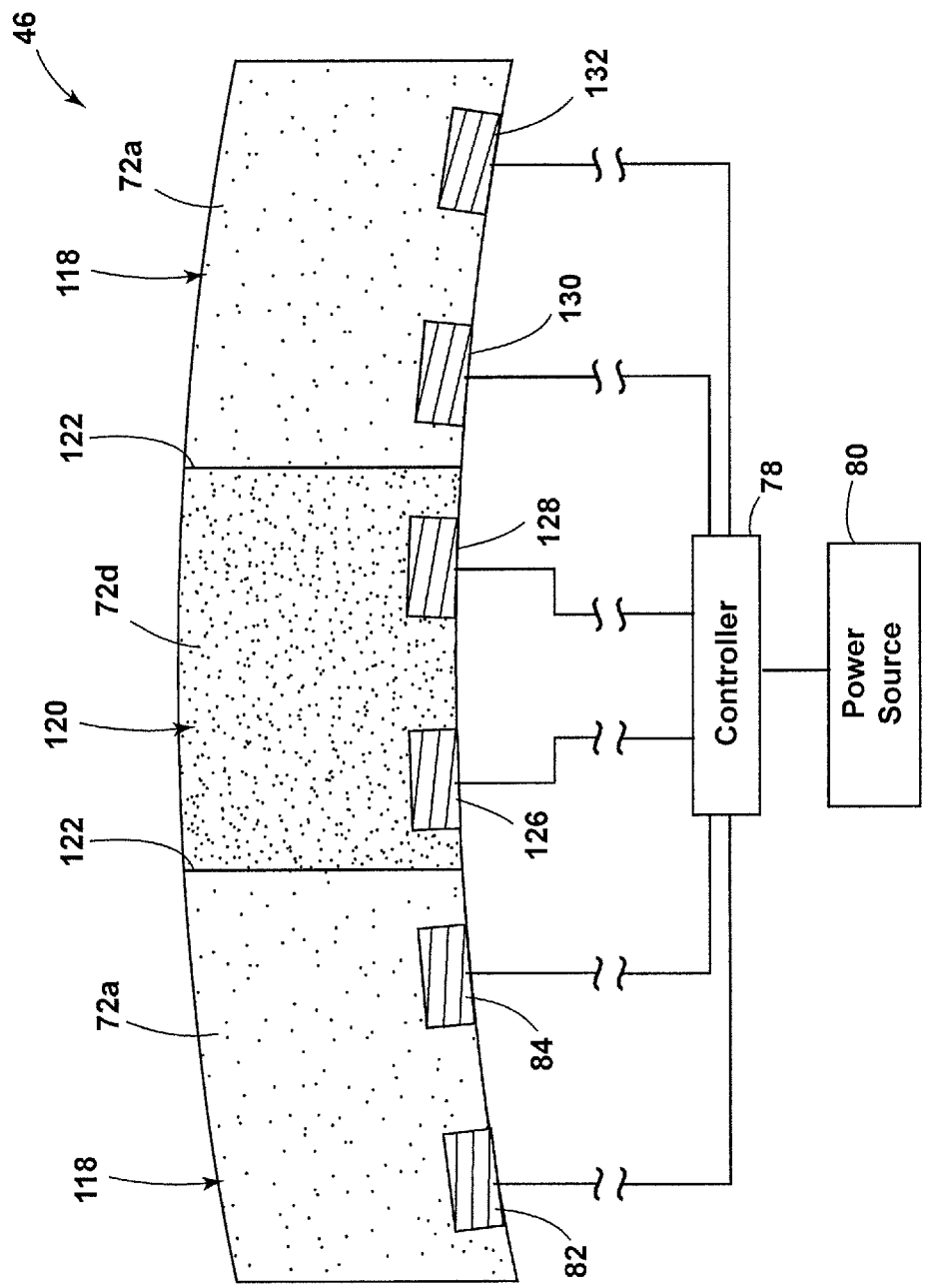
FIG. 10 illustrates a top view of a light-producing assembly, according to one embodiment, having varying types and concentrations of LED sources transversely along the light-producing assembly.
Figure 11:
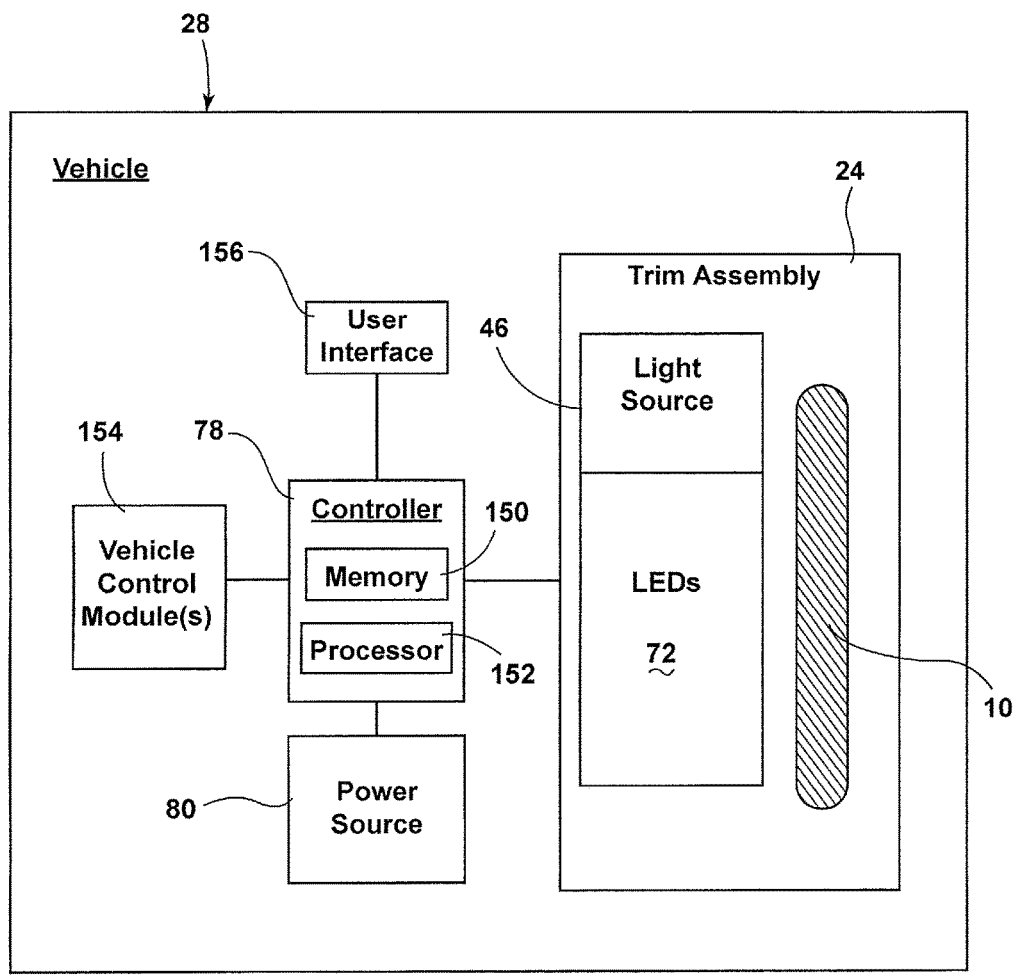
FIG. 11 is a block diagram of the vehicle and the lighting system.

Referring to FIG. 10, a block diagram of a vehicle 28 is shown in which the trim assembly 24 is implemented. The trim assembly 24 includes a controller 78 in communication with the light source 46. The controller 78 may include memory 150 having instructions contained therein that are executed by a processor 152 of the controller 78. The controller 78 may provide electrical power to the light source 46, or to a respective bus bar 82, 84, via a power source 80 located onboard the vehicle 28. In addition, the controller 78 may be configured to control the light output of each light source 46 based on feedback received from one or more vehicle control modules 154 such as, but not limited to, a body control module, engine control module, steering control module, brake control module, the like, and/or a combination thereof. By controlling the light output of the light source 46, the trim assembly 24 may illuminate in a variety of colors and/or patterns to provide an aesthetic appearance, or may provide vehicle information to an intended observer. For example, the trim assembly 24, when disposed on the body 26 of the vehicle 28, corresponding to an initiated turn indicator may supplement the primary turn indicators on the vehicle 28.

In operation, each photoluminescent structure 10 may exhibit a constant unicolor or multicolor illumination. For example, the controller 78 may prompt the light source 46 to emit only the first wavelength of light via the LED sources 72 to cause a photoluminescent structure 10 to illuminate in the first color (e.g., white). Alternatively, the controller 78 may prompt the light source 46 to emit only the second wavelength of light via the LED sources 72 to cause the photoluminescent structures 10 to illuminate in the second color (e.g., red). Alternatively still, the controller 78 may prompt the light source 46 to simultaneously emit the first and second wavelengths of light to cause the photoluminescent structures 10 to illuminate in a third color (e.g., pinkish) defined by an additive light mixture of the first and second colors. Moreover, additional photoluminescent structures 158 may be added to the trim assembly 24 that convert the light emitted from the light source 46 to a different wavelength. Alternatively still, the controller 78 may prompt the light source 46 to alternate between periodically emitting the first and second wavelengths of inputted light 100 to cause the photoluminescent structure 10 to periodically illuminate by alternating between the first and second colors of outputted light 102. The controller 78 may prompt the light source 46 to periodically emit the first and/or second wavelengths of inputted light 100 at a regular time interval and/or an irregular time interval.

In another embodiment, the trim assembly 24 may include a user interface 156. The user interface 156 may be configured such that a user may control the wavelength of light that is emitted by the LED sources 72 and/or the LED sources 72 that are illuminated. Such a configuration may allow a user to control which features are illuminated to assist in placing the vehicle transmission in a desired mode. The user interface 156 may be disposed within the vehicle cabin or on any surface that is accessible to the user during utilization of the trim assembly 24 described herein. The user interface 156 may use any type of control known in the art for control the light source 46, such as, but not limited to, proximity sensors.

With respect to the above examples, the controller 78 may modify the intensity of the emitted first and second wavelengths of light by pulse-width modulation or current control. In some embodiments, the controller 78 may be configured to adjust a color of the emitted light by sending control signals to adjust an intensity or energy output level of the light source 46. For example, if the light source 46 is configured to output the first emission at a low level, substantially all of the inputted light 100 may be converted to the outputted, visible light. If the light source 46 is configured to emit inputted light 100 at a high level, only a portion of the inputted light 100 may be converted to the outputted light 102 by the photoluminescent structure 10. In this configuration, a color of light corresponding to mixture of the inputted light 100 and the outputted light 102 may be output as the emitted light. In this way, each of the controllers 78 may control an output color of the emitted light.

Though a low level and a high level of intensity are discussed in reference to the inputted light 100, it shall be understood that the intensity of the inputted light 100 may be varied among a variety of intensity levels to adjust a hue of the color corresponding to the emitted light 100, 102 from the trim assembly 24. As described herein, the color of the outputted light 102 may be significantly dependent on the particular photoluminescent material 22 utilized in the photoluminescent structure 10. Additionally, a conversion capacity of the photoluminescent structure 10 may be significantly dependent on a concentration of the photoluminescent structures 10 utilized in the photoluminescent structure 10. By adjusting the range of intensities that may be emitted from the light source 46, the concentration and proportions of the photoluminescent materials 22 in the photoluminescent structure 10 and the types of photoluminescent materials 22 utilized in the photoluminescent structure 10 discussed herein may be operable to generate a range of color hues of emitted light 100, 102 by blending the inputted light 100 with the outputted light 102. It is also contemplated that the intensity of each light source 46 may be varied simultaneously, or independently, from any number of other light sources 46.

Accordingly, an illuminated trim assembly for a vehicle has been advantageously described herein. The trim assembly may provide various benefits including a simple and cost-effective means to produce a variety of illumination features that may be used as a styling feature and/or to provide exterior lighting to the vehicle in accordance with pre-defined events.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle trim assembly, comprising:
   a seal disposed around a periphery of a member, the member defining a light transmissive portion disposed between a first, opaque portion vehicle outward of the transmissive portion and a second, opaque portion vehicle downward of the transmissive portion;
   a light source operably coupled to a light guide, wherein the light guide transmits light along the member and the seal prevents light leakage between the member and a body panel; and
   a first photoluminescent structure disposed on the light guide.

2. The vehicle trim assembly of claim 1, wherein the light source comprises a plurality of printed LEDs.

3. The vehicle trim assembly of claim 1, wherein the first photoluminescent structure comprises at least one photoluminescent material configured to down convert an inputted light received from at least a portion of the light source into a visible light that is outputted to a viewable portion.

4. The vehicle trim assembly of claim 1, wherein the member extends around a wheel-well opening of a vehicle, wherein the first portion of the member extends substantially upwardly along a vertical portion of a body panel and the second portion extends substantially horizontally into the wheel-well opening of the vehicle.

5. The vehicle trim assembly of claim 1, wherein the light guide is integrally formed with the member such that the member.

6. The vehicle trim assembly of claim 3, wherein the inputted light comprises one of blue light, violet light, and UV light.

7. The vehicle trim assembly of claim 4, wherein the light guide includes an exterior surface, the photoluminescent structure disposed in a first portion of the exterior surface and a second portion of the exterior surface is free from the photoluminescent structure such that inputted and outputted light are emitted from the member.

8. A trim assembly for a vehicle, comprising:
   a member having a light transmissive portion, disposed between a first portion extending substantially upwardly along a body panel and a second portion extending substantially horizontally into a wheel-well, the light transmissive portion having a substantially uniform thickness with the first and second portions;
   a light source configured to emit light through the light transmissive portion; and
   a luminescent structure operably coupled with the light transmissive portion.

9. The trim assembly for a vehicle of claim 8, wherein the luminescent structure is disposed within the light transmissive portion.

10. The trim assembly for a vehicle of claim 8, wherein the light source comprises a printed LED.

11. The trim assembly for a vehicle of claim 9, wherein the luminescent structure is disposed on an exterior portion of the light transmissive portion such that inputted light and outputted light are emitted from separated locations of the light transmissive portion.

12. The trim assembly for a vehicle of claim 9, wherein a light guide is operably disposed between the light source and the light transmissive portion.

13. The trim assembly for a vehicle of claim 10, wherein the printed LED includes a viewable portion that correlates to the light transmissive portion of the member, wherein the printed LED and viewable portion are integrally formed with the member.

14. A vehicle trim assembly, comprising:
   a member having a light transmissive portion therein, the light transmissive portion disposed laterally outward of a wheel well;
   a light source configured to direct light in a vehicle upward direction and through the light transmissive portion;

a first photoluminescent structure disposed within a portion of the member and configured to luminesce in response to excitation by the light source; and a second photoluminescent structure disposed within the wheel well and configured to luminesce in response to excitation by light from the light source.

15. The vehicle trim assembly of claim 14, wherein the light sources comprise a plurality of printed LEDs.

16. The vehicle trim assembly of claim 14, wherein the light transmissive portion is configured as a light guide that is operably coupled with the light source.

17. The vehicle trim assembly of claim 14, wherein the member extends circumferentially around a vehicle wheel-well and the second photoluminescent structure is disposed on a vehicle wheel.

18. The vehicle trim assembly of claim 14, wherein the light source emits a first wavelength of an inputted light to excite the first photoluminescent structure and a second wavelength of inputted light to excite the second photoluminescent structure.

19. The vehicle trim assembly of claim 15, wherein the first and second photoluminescent structures each comprise at least one photoluminescent material configured to down convert an inputted light received from at least a portion of the light sources into a visible light.

20. The vehicle trim assembly of claim 19, wherein the inputted light comprises one of blue light, violet light, and UV light.

* * * * *